United States Patent [19]

Nunally

[11] Patent Number: 5,615,305
[45] Date of Patent: Mar. 25, 1997

[54] NEURAL PROCESSOR ELEMENT

[75] Inventor: Patrick O. Nunally, Diamond Bar, Calif.

[73] Assignee: Hughes Missile Systems Company, Los Angeles, Calif.

[21] Appl. No.: 116,642

[22] Filed: Sep. 7, 1993

Related U.S. Application Data

[63] Continuation of Ser. No. 833,817, Feb. 10, 1992, abandoned, which is a continuation of Ser. No. 611,213, Nov. 8, 1990, abandoned.

[51] Int. Cl.$^6$ .................................................. G06G 7/16
[52] U.S. Cl. .............................................. 395/24; 395/27
[58] Field of Search .................... 395/24, 27; 307/201, 307/443

[56] References Cited

U.S. PATENT DOCUMENTS

| | | | |
|---|---|---|---|
| 3,103,648 | 9/1963 | Hartmanis | 340/172.5 |
| 3,250,918 | 3/1966 | McGrogan, Jr. | 364/513 |
| 3,308,441 | 3/1967 | Dusheck, Jr. | 364/513 |
| 3,348,214 | 10/1967 | Barbetta | 340/172.5 |
| 3,457,552 | 7/1969 | Asendorf | 340/172.5 |
| 3,548,385 | 12/1970 | Tunis | 340/172.5 |
| 3,701,974 | 10/1972 | Rusell | 340/172.5 |
| 3,950,733 | 4/1976 | Cooper et al. | 340/172.5 |
| 4,094,307 | 6/1978 | Young, Jr. | 128/2.1 B |
| 4,193,115 | 3/1980 | Albus | 364/900 |
| 4,254,474 | 3/1981 | Cooper et al. | 364/900 |
| 4,419,544 | 12/1983 | Adelman | 179/107 |
| 4,479,241 | 10/1984 | Buckley | 382/15 |
| 4,637,402 | 1/1987 | Adelman | 128/746 |
| 4,660,166 | 4/1987 | Hopfield | 364/807 |
| 4,709,327 | 11/1987 | Hillis et al. | 364/200 |
| 4,731,747 | 3/1988 | Denker | 364/807 |
| 4,748,439 | 5/1988 | Robinson | 340/146 |
| 4,750,153 | 6/1988 | Owechko | 365/125 |
| 4,752,906 | 6/1988 | Kleinfeld | 364/807 |

(List continued on next page.)

OTHER PUBLICATIONS

Brownlow et al, "Pulse–Firing Neural Chips for Hundreds of Neurons", Advance in Neural Information Processing System 2, Nov. 1989, Morgan Kaufmann Publishers.

"Neural Computing, Theory and Practice" Philip D. Wasserman, Apr. 1989.

"VLSI Technologies for Artificial Neural Networks", IEEE 1989 by Karl Goser.

"An Analog CMOS Backward. Error–Propagation LSI" B. Furman and A.A. Abidi, Presented at First Annual InnS Sympocium, Sep. 1988.

Murray et al, "Pulse–Firing Neural Chips for Hundreds of Neurons", 1989 IEEE Conf. on Neural Inf. Processing System, Morgan Kaufmann.

Murray et al, "Programmable Analog Pulse–Firing Neural Networks", 1988 IEEE Conf. on Neural Inf. Processing System, Morgan Kaufmann.

Murray et al, "Asynchronous VLSI Neural Networks using Pulse – Stream Arithmetic", IEEE Journal of Solid State Circuits, Jun. 1988.

Fink "Electronics Engineers Handbook" McGraw Hill, 1975.

*Primary Examiner*—George B. Davis
*Attorney, Agent, or Firm*—Charles D. Brown; Wanda K. Denson-Low

[57] ABSTRACT

A neural processor element for use in a neural network includes a synaptic base weighting circuit which responds to an excitory input in the form of a stream of pulses of a first polarity which represents a sum of synaptic weights and an inhibitory input in the form of a stream of pulses of a second polarity which represents a sum of synaptic weights. The synaptic weight of the neural processor element is generated by summing the excitory and inhibitory pulse streams to produce a signal of varying level magnitude. This signal is subjected to a thresholding function which generates a pulse having a width corresponding to the sum of excitory and inhibitory pulse streams, this pulse width representing the synaptic weight for the neural processor element.

8 Claims, 5 Drawing Sheets

U.S. PATENT DOCUMENTS

| | | | |
|---|---|---|---|
| 4,762,397 | 8/1988 | Pepper | 350/331 |
| 4,827,453 | 5/1989 | Sawada et al. | 365/222 |
| 4,829,199 | 5/1989 | Prater | 307/443 |
| 4,875,183 | 10/1989 | Graf et al. | 395/24 |
| 4,893,255 | 1/1990 | Tomlinson, Jr. | 364/200 |
| 4,903,226 | 2/1990 | Tsividis | 364/807 |
| 4,906,865 | 3/1990 | Holler | 395/24 |
| 4,950,917 | 8/1990 | Holler et al. | 364/513 |
| 4,951,239 | 8/1990 | Andes et al. | 364/513 |
| 4,956,564 | 9/1990 | Holler et al. | 365/49 |
| 4,961,002 | 10/1990 | Tam et al. | 364/513 |
| 4,965,767 | 10/1990 | Kinoshita et al. | 365/189.05 |
| 4,985,644 | 1/1991 | Okihara et al. | 365/189.05 |
| 4,988,891 | 1/1991 | Mashiko | 364/713 |
| 5,010,512 | 4/1991 | Hartstein et al. | 364/807 |
| 5,021,693 | 6/1991 | Shima | 364/807 |
| 5,095,267 | 3/1992 | Merrill et al. | 324/158 R |
| 5,126,692 | 6/1992 | Shearer et al. | 331/8 |
| 5,196,741 | 3/1993 | Rustici | 307/353 |

NEURAL PROCESSOR ELEMENT

This is a continuation of application Ser. No. 07/833,817, filed Feb. 10, 1992, now abandoned which is a continuation of application Ser. No. 07/611,213 filed Nov. 8, 1990, now abandoned.

BACKGROUND OF THE INVENTION

The invention relates to neural network architecture, and more precisely, to the structure and operation of a node of such a network, the node being termed a neural processor element or, alternatively, a neuron.

Neural networks are models of the gross structure of the human brain, and represent a collection of nerve cells, or neurons, each connected to a plurality of other neurons from which it receives stimuli in the form of inputs and feedback, and to which it sends stimuli. Some interneuron connections are strong, others are weak. The human brain accepts inputs and generates responses to them, partly in accordance with its genetically programmed structure, but primarily by way of learning and organizing itself in reaction to inputs. Such self-organization marks a significant difference between the brain and an electronic processor, which operates only as permitted by algorithmic prescriptions.

Neural networks comprise multi-dimensional matrices made up of simple computational units (neurons) operating in parallel, that replicate some of the computational features of the human brain. A neuron (neuron$_x$) of a network of m neurons, is a unit that signals its state $S_x$ by the condition of a signal provided at its output, also termed its "axon". Such a signal may have a digital form with signal presence indicated by the "on" state of a digital pulse and absence by the "off" state of a pulse. Such signaling is conventional for many applications other than neural processing.

The state of the neuron $n_x$ can be altered by direct stimulation of the neuron from outside the network, as well as by contributions from other neurons in the network. The contribution from another neuron $n_y$ is weighted by an interneural synaptic weight $E_{xy}$. The state of the neuron $n_x$ is given by:

$$S_x = F(n_x) = F\left( \sum_{y=1}^{y=m} E_{xy} S_y \right) \quad (1)$$

Where $E_{xy}$ is the synaptic weight for the signal $S_y$ on the axon of the yth neuron. The function $F(n_x)$ describes the range of $S_x$ and the smoothness with which the neuron moves between the "off" and "on" state. The synaptic weight $E_{xy}$ tends to turn the neuron either on or off. A neural network learns by altering the E functions, and recalls or computes, ideally, by recursive processing which is asynchronous.

Those skilled in the art will realize that as the number of neurons proliferates, and as their interconnections multiply, a huge computational burden develops in the need to update or alter the synaptic weights in order to permit the network to learn. This burden has lead to the simplification of neural networks into realizable digital models which operate synchronously and according to an algorithm. Since the ideal which is being simulated is an asynchronous processor, utilization of synchronous digital models impairs the attainment of ideal operation. For example, a synchronous digital model of equation (1) would limit the $S_y$ variable by using typical voltage thresholds, and would perform the recursive updating of synaptic weight by a synchronously-clocked, algorithmic digital architecture. Such a structure will severely limit the number of realizable transfer functions.

SUMMARY OF THE INVENTION

The invention provides recursive, asynchronous neural processing in a neural processor element, or neuron, which uses a "pulse stream" signaling mechanism similar to that of the biological neuron. This results in network architecture operating in a dramatically different way than current algorithmic-based neural architecture. The neural processing element architecture of this invention is based upon the specific neural network definition of equation (1), extended by provision of an inhibitory input I according to the following relationship:

$$S_x = f(n_x) = f\left( \sum_{y=1}^{y=m} E_{xy} S_y + \sum_{y=1}^{y=m} I_{xy} S_y \right) \quad (2)$$

In equation (2) $E_{xy}$ and $S_y$ have the same meanings as assigned in equation (1). $I_{xy}$ is a direct input to the neuron $n_x$. In equation (2), therefore, the E inputs are the excitory inputs which drive forward the action of neuron $n_x$, while the I inputs reverse, or inhibit, the forward action of the neuron, and are independent of the excitory inputs.

In its essences, he invention involves a neural processor element for use in a neural network, the neural network being for connecting a plurality of neurons such that a first neuron, $n_x$, provides an output $S_x$ in response to the weighted outputs of a plurality of second neurons according equation (1). The neural processor element is an improvement on the neural network, and includes a weighting element, connected to neuron $n_y$, for producing $E_{xy}$ in response to $S_y$, $S_y$ being the output of neuron $n_y$, and $E_{xy}$ being a frequency-modulated signal having a first polarity. The weighting element further produces an inhibitory signal I, which is a frequency modulated signal having a second polarity. A pair of complementary elements are provided, a first of the complementary elements being connected to the weighting element for producing a first charging signal in response to $E_{xy}$, and a second complementary element being connected to the weighting element for producing a second charging signal in response to $I_{xy}$, the second charging signal being complementary to the first charging signal. A charge accumulator is connected to the pair of complementary elements for accumulating a charge in response to the first and second charging signals, and a digital waveform generator is connected to the charge accumulator for generating the output $S_x$ as a digital pulse having a pulse width corresponding to the magnitude of the charge.

The provision of an "impulse stream" interneural signal achieves the important objective of neural network operation in a mode corresponding to the signaling mechanism in a biological neuron. Further, the neuron architecture of this invention affords asynchronous neuron operation, eliminating the requirement for clocking mechanisms, which provides a distinct advantage over synchronous digital neural architectures.

Other distinct objectives and advantages of this invention will become evident when the following detailed description is read with reference to the drawings, described below.

DETAILED DESCRIPTION OF THE PREFERRED EMBODIMENT

Figure 1:
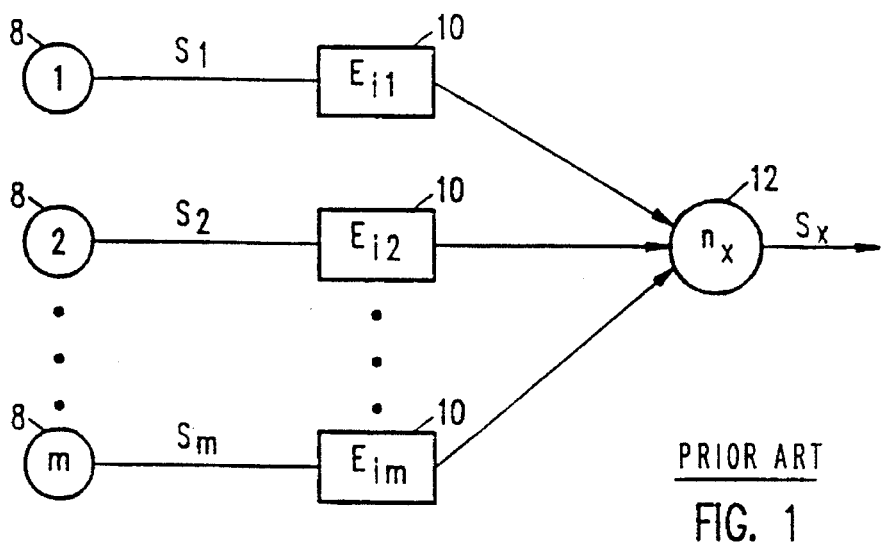
FIG. 1 is a network diagram illustrating a portion of a neural network in which the state $S_x$ of a neuron $n_x$ is determined by synaptically weighted state functions of neurons 1-m.

In FIG. 1 there are shown m neurons which produce state-indicating outputs $S_1$–$S_m$, respectively. Each state-indicating output is fed to a synaptic weighting element 10, which multiplies the output by an interneural synaptic weight $E_{xy}$. The weighted state-indicating outputs are fed to the ith neuron 12, which combines them according to equation (1) to produce a signal $S_x$ indicating the state of the neuron 12.

The layout of FIG. 1 is an idealized illustration of a portion of a prior art neural network. Such networks are characteristically illustrated in the form of multi-dimensional matrices in which layers of neurons interconnect, in the manner illustrated, with other layers. Although not explicitly illustrated, interconnections may involve inter-layer feedback.

Figure 2:
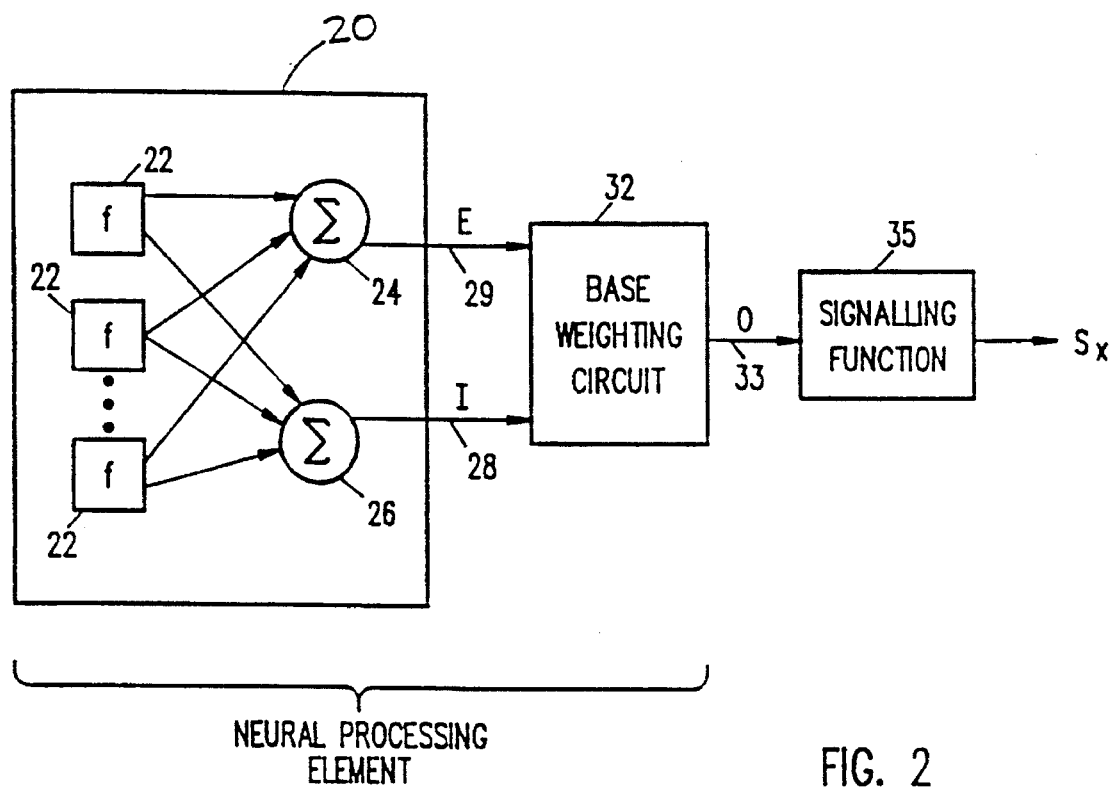
FIG. 2 is a block diagram illustrating the basic components of the invention.

A neural processing element, representing a neuron according to the invention is illustrated in FIG. 2. The neural processing element includes configuration logic 20 which receives the outputs of neurons 1-m in one layer and feeds them to respective frequency discriminators (f) 22, which in turn feed frequency discriminated signals to summation circuits 24 and 26. As discussed below, neuron outputs in this invention are frequency-modulated signals, such as frequency modulated impulse streams. Thus, the output $O_1$ from neuron $n_1$ would be a stream of impulses occurring at a frequency indicative of the state of the neuron. Relatedly, a first state would be indicated by a first repetition frequency, a second state by a second repetition frequency, and so on. In the invention, the repetition frequency of an impulse stream input to the configuration logic 20 signifies whether the input is to be considered an excitory or an inhibiting input. Thus, each of the frequency selective circuits 22 has 2 outputs, one to a summing circuit 24 which sums together all of the impulse streams whose repetition frequencies mark them as excitory signals. Similarly, each of the frequency selective circuits 22 also feeds a second summation circuit 26 which sums together all impulse streams whose repetition frequencies indicate that they are inhibitory signals. The summation circuits 24 and 26 operate conventionally to combine individual excitory and inhibitory impulse streams into a single excitory impulse stream conducted on signal line 29, and a single inhibitory impulse stream on signal line 28.

Signal lines 28 and 29 form the inputs for a base weighting circuit 32 which, together with the configurational logic 20, forms the basic neural processing element of this invention. The base weighting circuit combines the excitory and inhibitory signals on signal lines 29 and 28 to generate an output signal O on signal line 33. The signal O is a pulse having a width corresponding to a synaptic weight, which in turn corresponds to the combination of excitory and inhibitory signals received by the base weighting circuit 32.

Figure 3:
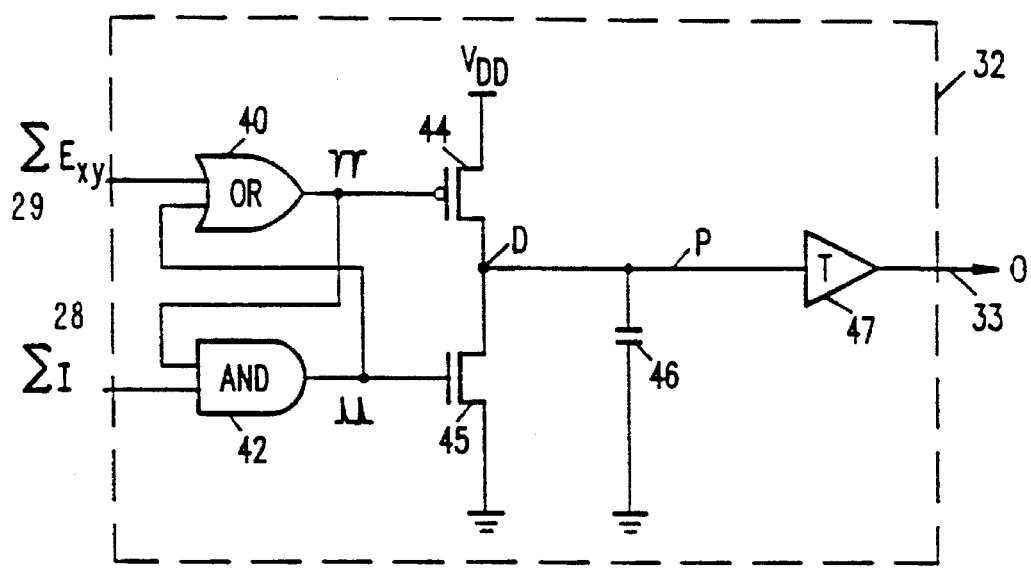
FIG. 3 is a logic diagram illustrating components of the base weighting circuit of FIG. 2.

For an understanding of the base weighting circuit 32, refer to FIG. 3. The base weighting circuit 32 includes an OR gate 40 and an AND gate 42, conventionally connected for lock-out operation. The outputs of the lock-out gates 40 and 42 are connected to the gate inputs of a pair of MOS transistors connected in a conventional compound, complementary serial fashion. In this regard, the PMOS transistor 44 has its drain connected to a voltage source $V_{DD}$ and its source connected to the drain of NMOS transistor 45, whose source is connected to ground. The source-drain interconnection between the transistors 44 and 45 provides the output of the complementary pair.

Continuing with the description of the base weighting circuit 32, the output of the complementary CMOS pair is provided to one plate of a capacitor 46 and in common with that plate to the input of a waveform generator 47. The waveform generator 47 is a thresholding (T) device which provides a level output that is changed in response to a signal on the device's input. The output of the generator 47 is provided on signal line 33 as the output O of the base weighting circuit 32.

Figure 4:
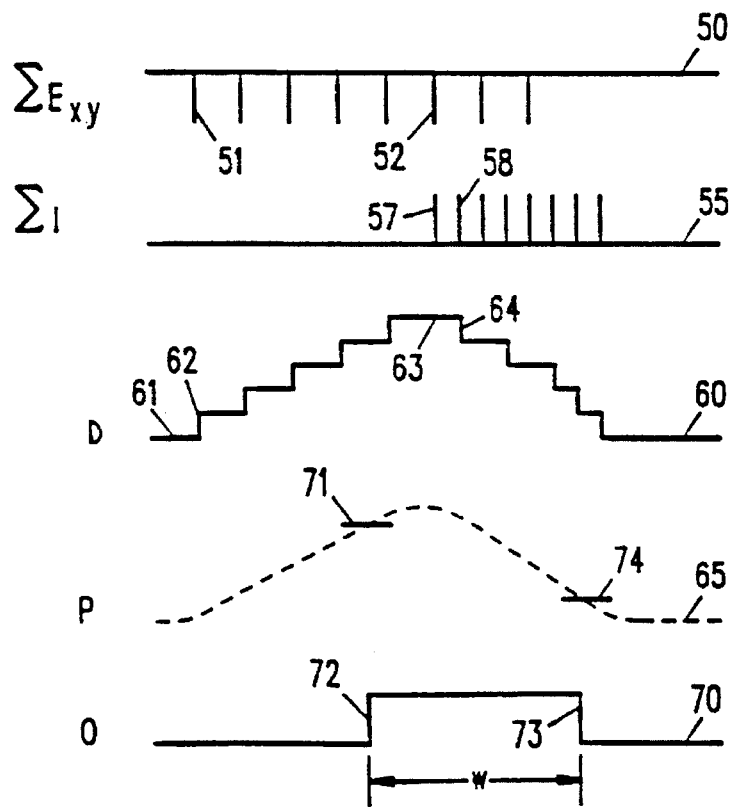
FIG. 4 is a set of waveforms illustrating the operation of the base weighting circuit of FIG. 3.

Operation of the base weighting circuit of FIG. 3 is understood with reference to the waveforms of FIG. 4. As stated above, each individual weighted neuron output received in the frequency selection elements 22 of the configuration logic 20 consists of a stream of impulses, whose frequency is a weighted function of the state of the generating neuron. The frequency selection elements 22 respond to impulse stream frequency by providing the received impulse stream to either the excitory summation circuit 24 or the inhibitory summation circuit 26. The results of the summation circuits 24 and 26 are respective impulse sequences whose frequencies are a function of the frequencies of all excitory or inhibitory pulse streams which are combined i he summation circuits. The output of the summation circuit 24, which is provided on signal line 29 to the base weighting circuit 32, is indicated by reference number 50 in FIG. 4, the inhibitory impulse stream by reference numeral 55.

As FIG. 4 indicates, the summation circuits 24 and 26 also impose respective polarities on the excitory and inhibitory pulse streams 50 and 55. In this regard, the excitory impulse stream is the sequence of negative-going impulses 51, 52, with the quiescent level of the stream being a relatively positive voltage level. The inhibitory impulse stream 55 has an inverse polarity, with a negative quiescent level and positive-going impulses 57, 58.

The operation of the base weighting circuit in response to the excitory and inhibitory pulse streams 50 and 55 is to provide a weighting signal with characteristics that convey a weight value that is used to modulate the output of the neuron. The impulse streams 50 and 55 are initially gated through the lock-out gates 40 and 42. When the two streams are quiescent, the output of the OR gate 40 is active in response to the positive level of the waveform 50, while the AND gate output is deactivated in response to the negative logic level of the waveform 55. The quiescent outputs of the lock-out gates 40 and 42 are fed to the PMOS and NMOS transistors 44 and 45, respectively, which keeps both devices turned off. Assuming the capacitor 46 is fully discharged at this point, the charge signal provided by the complementary pair 44, 45 taken at point D in FIG. 3 is illustrated by the waveform 60. The actual charge waveform on the capacitor is represented at point P by waveform 65. In the initial quiescent state, the charging waveform D is at level 61.

Assume now that the time history of waveforms 50 and 55 recede to the left so that impulses 51 and 57 are, respectively, the first excitory and inhibitory impulses provided to the lock-out pair 40, 42. When the impulse 51 arrives, the output of the OR gate 40 is deactivated, turning on the PMOS transistor 44 and stepping up the charge provided to the capacitor 46 as indicated by the step increase 62 in the waveform 60. The succession of impulses in the waveform 50 continue to step up the charge on the capacitor 46, until the first positive-going pulse 57 in the inhibitory impulse stream is encountered. As FIG. 4 shows, the impulses 52 and 57 arrive simultaneously at the lock-out gate, and neutralize one another, with the effect illustrated in the flat portion 63 of the charging waveform O. Next, the inhibitory pulse 58 activates the output of the AND gate 42, turning on the NMOS transistor 45 and providing a discharge step 64 in the waveform O. With the arrangement of impulses illustrated in FIG. 4, capacitor 46 is eventually discharged, as illustrated by the waveform 60.

The actual charging waveform 65 of the capacitor 46 is fed to the generator 47. Its operation causes the generator 47 to recognize a first threshold level 71 and a second threshold level 74. The resultant output O of the generator 47 is illustrated by the waveform 70 which is activated at 72 by the level 71 in the charging waveform 65, and which is deactivated at 73 by transition of the charge waveform 65 through the second threshold 74.

The implication of FIG. 4 is that the base weighting circuit 32 provides a synaptic weighting signal O. The weighting significance of the output signal O is in the width, W, of the pulse produced by the signal generator 47. As will be appreciated from the explanation above with reference to FIGS. 3 and 4, the weighting significance of this pulse results from the combination of the excitory and inhibitory impulse streams. As explained above, the neural intelligence communicated by those impulse streams lies in their polarity and relative frequency.

Returning to FIG. 2, the complete structure of the neuron includes a signaling function circuit 35 which provides a neural output signal $S_x$ having imposed on it the neural characteristics according to equation (2). Preferably, these characteristics would be in the form of frequency modulation of an impulse stream which is forwarded to the next level of neurons in the network. For this purpose, the signaling function 35 can, for example, be embodied in a keyed oscillator providing a pulse stream having a frequency determined by the width of the signal O output by the circuit 32.

The base weighting circuit of FIG. 3 illustrates, in principle, how the synaptic weighting function of a neuron is generated in response to excitory and inhibitory inputs from other neurons in a neuron network. In this regard, the interneuronal inputs are frequency-based (that is, a function of time). The neuron decides to fire, sending its own frequency signal in the form of a train of impulses to other neurons, or not to fire, depending upon whether or not the attenuated frequency sum of the input signals exceeds a prescribed threshold (which is a function of space). The rate of firing of the neuron (its spike frequency) as a function of the time-based sum of inputs (temporal) and the threshold value (space) represents a multi-dimensional (spatio-temporal) transfer function or response of the neuron.

Some practical considerations of the preferred embodiment of FIG. 3 are incorporated in a best mode of practicing the embodiment. In this regard, the operation of the capacitor 46 is such that when it receives a constant current it will be charged exponentially. Since the transistors 44 and 45 that are driving this capacitor may well be driven into the cutoff or saturation regions of operation, a constant current is, in effect, delivered to the capacitor. The effects of the response of the capacitor to the constant current affect the threshold function of the waveform generator 47. When a number of excite impulses are received, the charge on the capacitor 46 from the latest impulse will be less than the charge from the previous impulse; then, when an inhibit impulse is received, it will have a greater effect than the preceding excite impulse. Ideally, the capacitor 46 should be charged linearly, which would cause equal contribution of excite and inhibit impulses and which would lengthen the dynamic operational bounds of the base weighting circuit 32.

Figure 5:
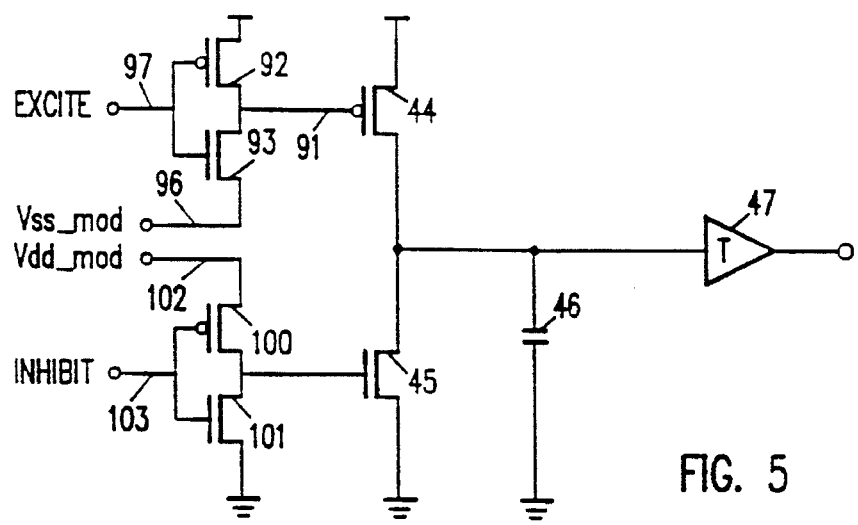
FIG. 5 is a circuit diagram illustrating the best mode of the base weighting circuit of FIG. 3.

To correct the problem of charging the capacitor 46, its charging current should not be constant, but should vary depending on the level of charge. To acquire a varying current, the transistors 44 and 45 must be operated in their linear regions. Since these transistors are MOSFETs, which the inventor contemplates will be made using a VLSI process, special measures must be taken to ensure their linear operation. For each transistor, its gate voltage must be set at an intermediate value between $V_{dd}$ and $V_{ss}$ to achieve a varying bias Gate voltages in this region are provided by inverters, as illustrated in FIG. 5. In FIG. 5, each of the MOSFETs 44 and 45 derives its respective gate voltage from a modified CMOS inverter. Thus, the MOSFET 44 derives its gate voltage from an inverter consisting of PMOS and NMOS field effect transistors 92 and 93 whose gates are tied together and who receive the excitory impulses at 97. The NMOS transistor 45 receives its gate signal from an inverter consisting of PMOS and NMOS transistors 100 and 101. These transistors have their gates tied together and receive the inhibitory impulses at 103. The inverter driving the PMOS transistor 44 is biased between the drain voltage $V_{dd}$ and a modified source voltage $V_{ss}$_mod. The lower inverter consisting of transistors 100 and 101 is biased between a modified drain voltage $V_{dd}$_mod and ground.

Figure 6:
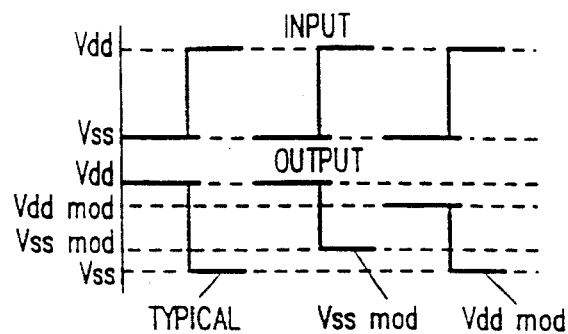
FIG. 6 is a waveform diagram illustrating the operation of inverters included in FIG. 5.
Figure 7:
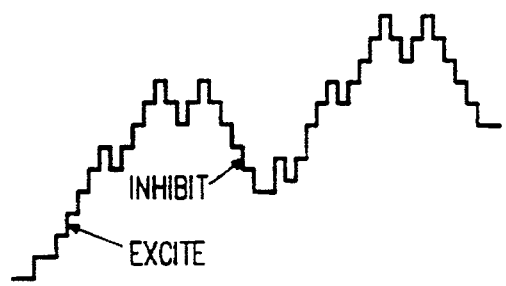
FIG. 7 is a waveform diagram illustrating the output of the base waiting circuit of FIG. 5.

The responses of the modified inverters of FIG. 5 to input signals are shown in FIG. 6. For example, either an excitory or an inhibitory pulse traverses $V_{dd}$-$V_{ss}$. A typical inverter biased between these two voltage levels would transition as shown in the waveform labeled "typical". The modified inverter consisting of the transistors 92 and 93 would transition as illustrated in the output waveform labeled "$V_{ss}$_mod", while the inverter consisting of transistors 100 and 101 would respond according to the output waveform labeled "$V_{dd}$_ mod". Thus, with the modification illustrated in FIG. 5, the base weighting circuit now has the ability to utilize excitory and inhibitory impulses in time-based equal strengths. This architecture is simple, small, and easily implemented in VLSI technology; and, it uses the state of the neuron as a linear (algebraic) summation of the excitory and inhibitory impulses as shown in FIG. 7.

Utilization of the modified inverters in the base weighting circuit as illustrated in FIG. 5 results in a significant decrease in the width of the pulses which charge the capacitance 46. Because of the smaller pulse widths, the neuron requires more pulses when increasing or decreasing its state, which creates a higher resolution of frequency differential. In implementing the device of FIG. 5 in integrated circuit form, the pins that control the drain and source and modified voltages are connected to pads which enable the determination of the optimum values for operation.

Figure 10:
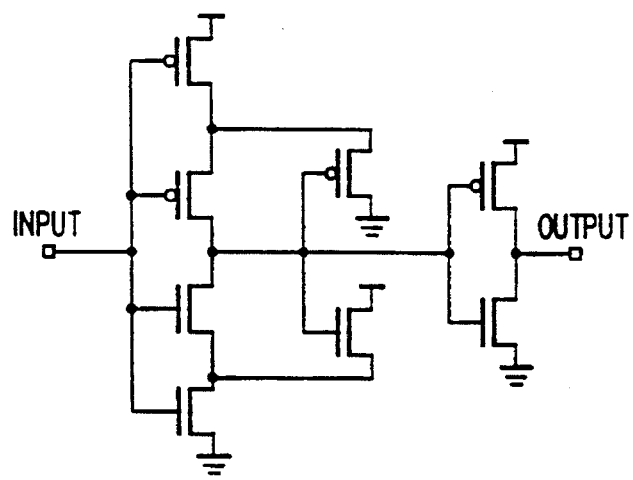
FIG. 10 is a circuit diagram illustrating a Schmitt trigger which implements a step function.
Figure 9:
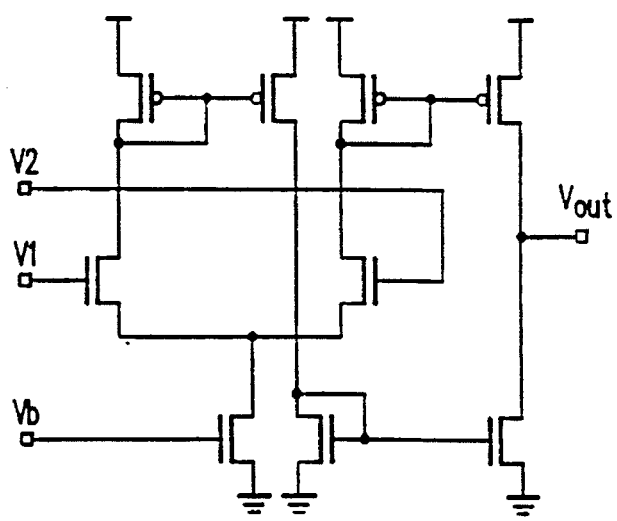
FIG. 9 is a circuit diagram illustrating a differential amplifier for implementing a hyperbolic tangent function.
Figure 8:
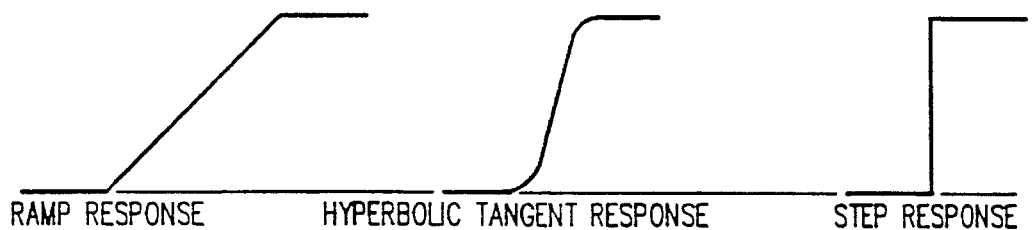
FIG. 8 is a waveform diagram illustrating three possible threshold functions implemented by a waveform generator in the base waiting circuits of FIGS. 3 and 5.
Figure 11:
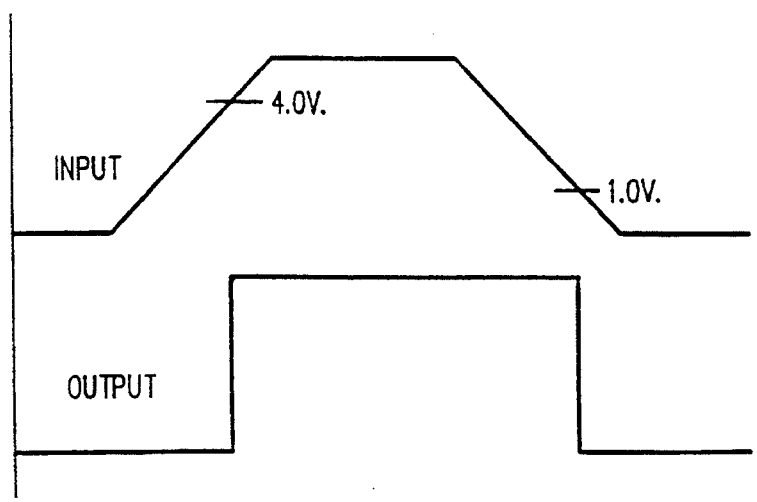
FIG. 11 is a waveform diagram illustrating the operation of the Schmitt trigger of FIG. 10.

Practical functional concerns of a neuron including the base weighting circuits of FIGS. 3 or 5 require the bounding of neuron firing. Such bounding results in a threshold value which is provided to neurons in a layer of a neural network. The bounding function enables synaptic weighting and recombination. A number of different thresholding mechanisms are available, including structures which provide ramp, hyperbolic tangent, and step functions as shown by the waveforms in FIG. 8. Any of these waveforms can characterize the threshold function implemented by the waveform generator 47 in FIGS. 3 and 5. For example, to achieve the ramp function, the voltage on the capacitor 46 can be buffered and provided directly, since it is the linear integration of the excitory and inhibit impulses. The hyperbolic tangent function can be acquired by applying the voltage on the capacitor 46 through a differential amplifier, such as the amplifier illustrated in FIG. 9. The step function of FIG. 8 is provided by application of the voltage on the capacitor 46 to a Schmitt-triggered buffer such as that illustrated in FIG. 10. Operation of the waveform generator as a Schmitt trigger is illustrated in FIG. 11 wherein trip voltages of 4.0 and 1.0 volts are incorporated into the operation of the circuit.

Figure 12:
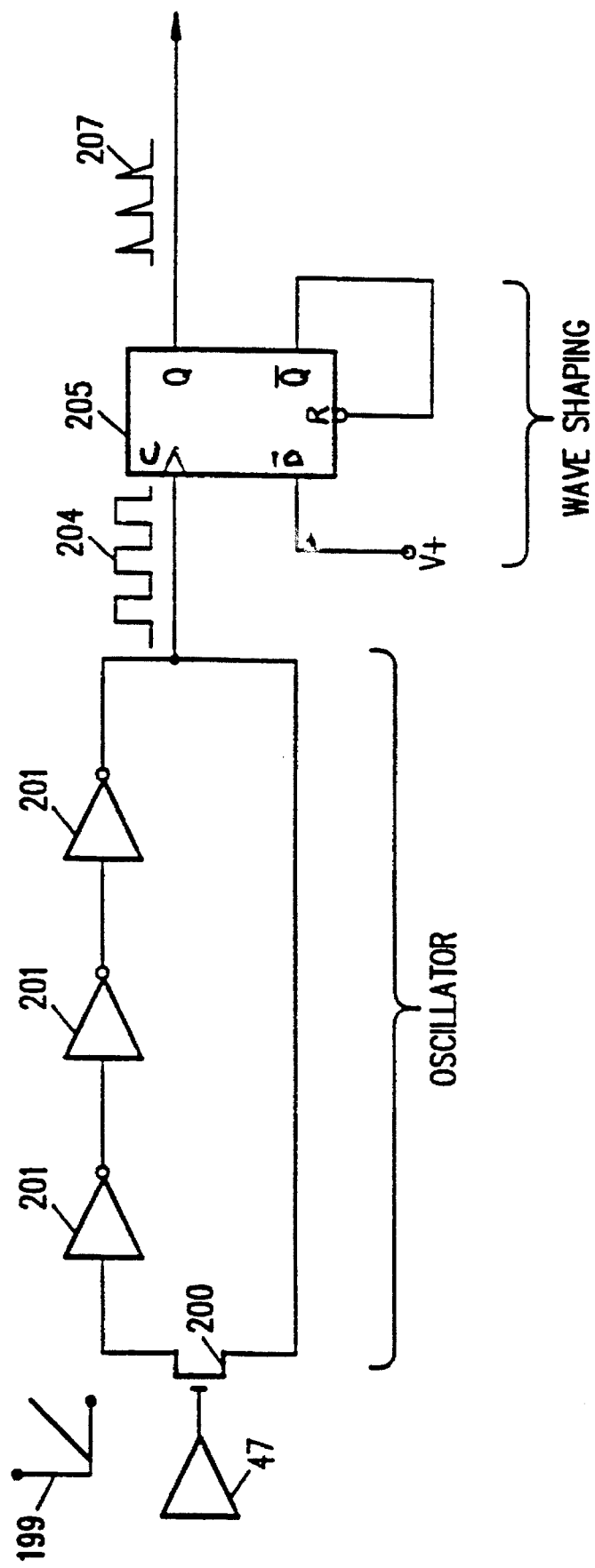
FIG. 12 is a circuit diagram illustrating a voltage-to-pulse generator.

Refer now to FIG. 12 for an understanding of how the neural processor element converts the linearized, bounded waveform representing the charge on the capacitor 46 of FIG. 5 into a pulse waveform representing the weighted output of the neural processor element. As described above, the thresholding component 47 outputs a linearized, bounded voltage level signal indicated by reference numeral 199. The voltage level reference signal is fed to an oscillator including a field effect transistor 200 and a plurality of CMOS inverters 201. Such an oscillator is known in the art and is referred to as a "ring" or "voltage-controlled" oscillator. The oscillator produces a square wave 204 whose frequency is proportional to the level of the voltage output by thresholding element 47. The square wave 204 is converted to a pulse stream by a D flip-flop connected conventionally as a wave-shaping device. As a wave-shaper the flip-flop 205 is clocked by the square wave 204, while its D input is tied to a positive voltage. The reset (R) port of the flip-flop is connected to the $\bar{Q}$ output, which results in a pulse being produced for each rising edge of the square wave 204. The result is a pulse stream 207 having the frequency of the square wave 204. Since the pulse stream's frequency is directly determined by the weighting voltage, the frequency output by the neural processor element is said to be "weighted" by its inputs.

Although not illustrated herein, it is asserted that the pulse stream 207 can be given excitory or inhibitory polarity through a multiplexer with selectable inverting and non-inverting outputs.

While I have described a preferred embodiment of my invention, it should be understood that modifications and adaptations thereof will occur to persons skilled in the art. Therefore, the protection afforded my invention should only be limited in accordance with the scope of the following claims.

I claim:

1. In a neural network for connecting a plurality of neurons such that a first neuron, $n_x$, provides an output, $S_x$, according to the equation:

$$S_x = f\left\{ \sum_{y=1}^{y=m} E_{xy} S_y \right\}$$

where y is an integer between 1 and m, $E_{xy}$, is an interneural synaptic weight obtaining between said first neuron and a neuron, neuron y, in a plurality, m, of second neurons, $S_y$ is an output of neuron y, a neuron circuit, which comprises:

a first terminal, connected to neuron y, for inputting a frequency modulated signal having
a first polarity and representing $E_{xy}$;
a second terminal for receiving an inhibiting signal I, I being a frequency modulated signal having a second polarity:
a pair of complementary transistor means, a first complementary transistor means connected to said first terminal for producing a first charging signal in response to the frequency modulated signal representing $E_{xy}$, and a second complementary transistor means connected to said second terminal for producing a second charging signal in response to I, said second charging signal being complementary to said first charging signal;
charge accumulation means connected to said pair of complementary transistor means for accumulating a charge having a magnitude in response to said first and second charging signals;
buffer means connected to said charge accumulation means for producing a continuous ramped voltage level signal having a magnitude corresponding to the magnitude of said charge;
signalling means connected to said buffer means for generating said output $S_x$ as a pulse stream having a frequency corresponding to the magnitude of said ramped voltage level signal; and
lock-out gates electrically interposed between the terminals and the complementary transistor means.

2. The neuron circuit of claim 1, wherein the lock-out gates comprise an OR gate and an AND gate.

3. The neuron circuit of claim 1, further comprising first and second inverters to bias the complementary transistor means, wherein said inverters are electrically interposed between the terminals and the complementary transistor means.

4. The neuron circuit of claim 1, wherein the pair of complementary transistors means includes a complementary pair of MOSFETS.

5. The neuron circuit of claim 4, wherein the complementary pair of MOSFETS includes:

a PMOSFET having a drain for connection to a drain potential, a gate connected to the first terminal, and a source; and an NMOSFET having a drain connected to the source of the PMOSFET, a gate connected to the second terminal, and a source for connection to a source potential.

6. The neuron circuit of claim 1, wherein the signalling means includes a different amplifier.

7. The neuron circuit of claim 1, wherein the signalling means includes a Schmitt trigger.

8. In a neural network for connecting a plurality of neurons such that a first neuron, $n_x$, provides an output, $S_x$, according to the equation:

$$S_x = f\left\{ \sum_{y=1}^{y=m} E_{xy}S_y \right\}$$

where y is an integer between 1 and m, $E_{xy}$ is an interneural synaptic weight obtaining between said first neuron and a neuron, neuron y, in a plurality, m, of second neurons, $S_y$ is an output of neuron y, a neuron circuit, which comprises:

a first terminal, connected to neuron y, for inputting a frequency modulated signal having
 a first polarity and representing $E_{xy}$;
 a second terminal for receiving an inhibiting signal I, I being a frequency modulated signal having a second polarity:

a pair of complementary transistor means, a first complementary transistor means connected to said first terminal for producing a first charging signal in response to the frequency modulated signal representing $E_{xy}$, and a second complementary transistor means connected to said second terminal for producing a second charging signal in response to I, said second charging signal being complementary to said first charging signal:

charge accumulation means connected to said pair of complementary transistor means for accumulating a charge having a magnitude in response to said first and second charging signals:

buffer means connected to said charge accumulation means for producing a continuous ramped voltage level signal having a magnitude corresponding to the magnitude of said charge:

signalling means connected to said buffer means for generating said output $S_x$ as a pulse stream having a frequency corresponding to the magnitude of said ramped voltage level signal; and a first inverter biased with a first voltage and electrically interposed between the first terminal and the complementary transistor means; and a second inverter biased with a second voltage and electrically interposed between the second terminal and the complementary transistor means, wherein the second voltage is different that the first voltage.

* * * * *